US012725398B2

(12) United States Patent
Rodrigues et al.

(10) Patent No.: US 12,725,398 B2
(45) **Date of Patent: *Sep. 1, 2026**

(54) IMAGE MATCHING APPARATUS, CONTROL METHOD, AND NON-TRANSITORY COMPUTER-READABLE STORAGE MEDIUM

(71) Applicant: NEC Corporation, Tokyo (JP)

(72) Inventors: Royston Rodrigues, Tokyo (JP); Masahiro Tani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 261 days.

This patent is subject to a terminal disclaimer.

(21) Appl. No.: 18/274,184

(22) PCT Filed: Mar. 26, 2021

(86) PCT No.: PCT/JP2021/013105

§ 371 (c)(1),
(2) Date: Jul. 25, 2023

(87) PCT Pub. No.: WO2022/201545

PCT Pub. Date: Sep. 29, 2022

(65) Prior Publication Data

US 2024/0096052 A1 Mar. 21, 2024

(51) Int. Cl.
*G06V 10/75* (2022.01)
*G06V 10/26* (2022.01)
(Continued)

(52) U.S. Cl.
CPC .......... *G06V 10/759* (2022.01); *G06V 10/267* (2022.01); *G06V 10/44* (2022.01);
(Continued)

(58) Field of Classification Search
CPC . G06T 2207/10032; G06T 2207/20084; G06T 7/33; G06V 10/267; G06V 10/44;
(Continued)

(56) References Cited

U.S. PATENT DOCUMENTS 8,989,483 B2 * 3/2015 Cheng .................... G06V 20/20 382/154
11,170,524 B1 * 11/2021 Mishra ...................... G06T 7/73
(Continued)

FOREIGN PATENT DOCUMENTS

JP 2014-194831 A 10/2014
JP 2018-205937 A 12/2018

OTHER PUBLICATIONS

International Search Report for PCT Application No. PCT/JP2021/013105, mailed on Jun. 22, 2021.
(Continued)

*Primary Examiner* — Oneal R Mistry
(74) *Attorney, Agent, or Firm* — Sughrue Mion, PLLC

(57) ABSTRACT

The image matching apparatus (2000) acquires a ground-view image (20) and an aerial-view image (30). The image matching apparatus (2000) extracts features from the ground-view image (20). The image matching apparatus (2000) extracts features from the aerial-view image (30). The image matching apparatus (2000) extracts a plurality of partial aerial regions (32) from the aerial-view image (30), and extracts features from each partial aerial region (32). The image matching apparatus (2000) computes, for each partial aerial region (32), a combined aerial feature by combining the features of the partial aerial region (32) and the features of the aerial-view image (30). The image matching apparatus (2000) determines, for each partial aerial region (32), whether the partial aerial region (32) matches the ground-view image (20) by comparing the combined aerial feature of the partial aerial region (32) and the features of the ground-view image (20).

15 Claims, 9 Drawing Sheets

(51) Int. Cl.
*G06V 10/44* (2022.01)
*G06V 10/74* (2022.01)
*G06V 10/82* (2022.01)

(52) U.S. Cl.
CPC .......... *G06V 10/751* (2022.01); *G06V 10/761* (2022.01); *G06V 10/82* (2022.01)

(58) Field of Classification Search
CPC .... G06V 10/74; G06V 10/751; G06V 10/759; G06V 10/761; G06V 10/806; G06V 10/82; G06V 20/13; G06V 20/17; G06V 20/56
See application file for complete search history.

(56) References Cited

U.S. PATENT DOCUMENTS

| | | | | |
|---|---|---|---|---|
| 11,215,462 | B2 * | 1/2022 | Mittal | G06T 7/74 |
| 2012/0120069 | A1 * | 5/2012 | Kodaira | G06T 17/05<br>345/419 |
| 2014/0064554 | A1 * | 3/2014 | Coulter | G06T 7/254<br>382/294 |
| 2014/0161362 | A1 | 6/2014 | Cao et al. | |
| 2016/0063516 | A1 * | 3/2016 | Terrazas | G06V 10/56<br>705/7.29 |
| 2017/0236284 | A1 * | 8/2017 | Elliethy | G06T 7/33<br>382/294 |
| 2019/0137269 | A1 * | 5/2019 | Broere | G01C 11/34 |
| 2020/0134844 | A1 | 4/2020 | Mittal et al. | |
| 2020/0202616 | A1 * | 6/2020 | Yu | G06T 17/05 |
| 2021/0132612 | A1 * | 5/2021 | Wang | G06V 20/13 |
| 2021/0398300 | A1 * | 12/2021 | Gupta | G06T 7/33 |
| 2025/0139939 | A1 | 5/2025 | Rodrigues et al. | |

OTHER PUBLICATIONS

English translation of Written opinion for PCT Application No. PCT/JP2021/013105, mailed on Jun. 22, 2021.

Yujiao Shi et al., "Where am I looking at? Joint Location and Orientation Estimation by Cross-View Matching", 2020 IEEE/CVF Conference on Computer Vision and Pattern Recognition (CVPR), Computer Research Repository, arXiv:2005.03860, May 8, 2020.

Liu Liu et al., "Lending Orientation to Neural Networks for Cross-view Geo-localization", 2019 IEEE/CVF Conference on Computer Vision and Pattern Recognition (CVPR), Jun. 20, 2019, pp. 5617-5626.

Yujiao Shi et al., "Where am I looking at? Joint Location and Orientation Estimation by Cross-View Matching", 2020 IEEE/CVF Conference on Computer Vision and Pattern Recognition (CVPR), Jun. 19, 2020, pp. 4063-4071.

JP Official Communication for JP Application No. 2024-555224, mailed on Nov. 25, 2025 with English Translation.

Yicong Tian et al.; Cross-View Image Matching for Geo-localization in Urban Environments; 2017 IEEE conference on Computer Vision and Pattern Recognition (CVPR); Jul. 21, 2017.

International Search Report for PCT Application No. PCT/JP2022/014655 mailed on Jun. 21, 2022 (English only).

Liu Liu and Hongdong Li, "Lending Orientation to Neural Networks for Cross-view Geolocalization", Mar. 29, 2019, pp. 4321-4330 [retrieved on Sep. 24, 2021], retrieved from <arXiv, https://arxiv.org/pdf/1903.12351>.

Jeffrey Pennington, Richard Socher, and Christopher D. Manning, "GloVe: Global Vectors for Word Representation", Proceedings of the 2014 Conference on Empirical Methods in Natural Language Processing (EMNLP), Oct. 25, 2014, pp. 1532-1543.

Tomas Mikolov, Ilya Sutskever, Kai Chen, Greg Corrado, and Jeffrey Dean, "Distributed Representations of Words and Phrases and their Compositionality", [online], Oct. 16, 2013, pp. 1-9 [retrieved on Mar. 10, 2022], retrieved from <arXiv, https://arxiv.org/pdf/1310.4546.pdf>.

Yingying Zhu, Bin Sun, Xiufan Lu, Sen Jia, Geographic Semantic Network for Cross-View Image Geo-Localization, IEEE Transactions on Geoscience and Remote Sensing, Oct. 18, 2021, vol. 60, pp. 1-17, <https://ieeexplore.ieee.org/document/9579411>.

US Office Action for U.S. Appl. No. 18/836,860, mailed on May 12, 2026.

T. -Y. Lin, S. Belongie and J. Hays, "Cross-View Image Geolocalization," 2013 IEEE Conference on Computer Vision and Pattern Recognition, Portland, OR, USA, 2013, pp. 891-898. (Year: 2013).

* cited by examiner

IMAGE MATCHING APPARATUS, CONTROL METHOD, AND NON-TRANSITORY COMPUTER-READABLE STORAGE MEDIUM

This application is a National Stage Entry of PCT/JP2021/013105 filed on Mar. 26, 2021, the contents of all of which are incorporated herein by reference, in their entirety.

TECHNICAL FIELD

The present disclosure generally relates to image matching, in particular, matching between a ground-view image and an aerial-view image.

BACKGROUND ART

A computer system that performs ground-to-aerial cross-view matching (matching between a ground-view image and an aerial-view image) has been developed. For example, NPL1 discloses a system that comprises a set of CNNs (Convolutional Neural Networks) for extracting features from a ground-view image and an aerial-view image to be compared with each other to determine whether the ground-view image matches the aerial-view image.

Specifically, one of the CNNs acquires a ground-view image and extracts features therefrom. The other one acquires a polar-transformed aerial-view image, and extracts features therefrom. Then, the system estimates the orientation alignment of the ground-view image with respect to the aerial-view image by computing the correlation between the features extracted from the ground-view image and those extracted from the aerial-view image. Based on the orientation alignment, the system shifts and crops out a section of the features of the aerial-view image that is estimated to correspond to the ground-view image. Then, the features of the ground-view image are compared with the cropped features of the aerial-view image to determine whether the ground-view image matches the aerial-view image.

CITATION LIST

Non Patent Literature

NPL1: Yujiao Shi, Xin Yu, Dylan Campbell, and Hongdong Li, "Where am I looking at? Joint Location and Orientation Estimation by Cross-View Matching," Computer Research Repository, arXiv:2005.03860, May 8, 2020

SUMMARY OF INVENTION

Technical Problem

There may exist situations where a section of an aerial-view image corresponding to the ground-view image may include objects that are not included in the ground-view image, or vice versa. These situations are considered to affect the accuracy of ground-to-aerial cross-view matching performed by the system disclosed by NPL1. An objective of the present disclosure is to provide a technique to improve the accuracy of ground-to-aerial cross-view matching.

Solution to Problem

The present disclosure provides an image matching apparatus that comprises at least one processor and memory storing instructions. The at least one processor is configured to execute the instructions to: acquire a ground-view image and an aerial-view image; extract features from the ground-view image; extract features from the aerial-view image; extract a plurality of partial aerial regions from the aerial-view image; extract features from each of the plurality of the partial aerial regions; for each of the plurality of the partial aerial regions, compute a combined aerial feature by combining the features of the partial aerial region and the features of the aerial-view image; and for each of the plurality of the partial aerial regions, determine whether the partial aerial region matches the ground-view image by comparing the combined aerial feature of the partial aerial region and the features of the ground-view image.

The present disclosure further provides a control method that is performed by a computer. The control method comprises: acquiring a ground-view image and an aerial-view image; extracting features from the ground-view image; extracting features from the aerial-view image; extracting a plurality of partial aerial regions from the aerial-view image; extracting features from each of the plurality of the partial aerial regions; for each of the plurality of the partial aerial regions, computing a combined aerial feature by combining the features of the partial aerial region and the features of the aerial-view image; and for each of the plurality of the partial aerial regions, determining whether the partial aerial region matches the ground-view image by comparing the combined aerial feature of the partial aerial region and the features of the ground-view image.

The present disclosure further provides a non-transitory computer readable storage medium storing a program. The program that causes a computer to execute: acquiring a ground-view image and an aerial-view image; extracting features from the ground-view image; extracting features from the aerial-view image; extracting a plurality of partial aerial regions from the aerial-view image; extracting features from each of the plurality of the partial aerial regions; for each of the plurality of the partial aerial regions, computing a combined aerial feature by combining the features of the partial aerial region and the features of the aerial-view image; and for each of the plurality of the partial aerial regions, determining whether the partial aerial region matches the ground-view image by comparing the combined aerial feature of the partial aerial region and the features of the ground-view image.

Advantageous Effects of Invention

According to the present disclosure, it is possible to provide a technique to improve accuracy of ground-to-aerial cross-view matching.

DESCRIPTION OF EMBODIMENTS

Example embodiments according to the present disclosure will be described hereinafter with reference to the drawings. The same numeral signs are assigned to the same elements throughout the drawings, and redundant explanations are omitted as necessary. In addition, predetermined information (e.g. a predetermined value or a predetermined threshold) is stored in advance in a storage device to which a computer using that information has access unless otherwise described.

First Example Embodiment

<Overview>

Figure 1:
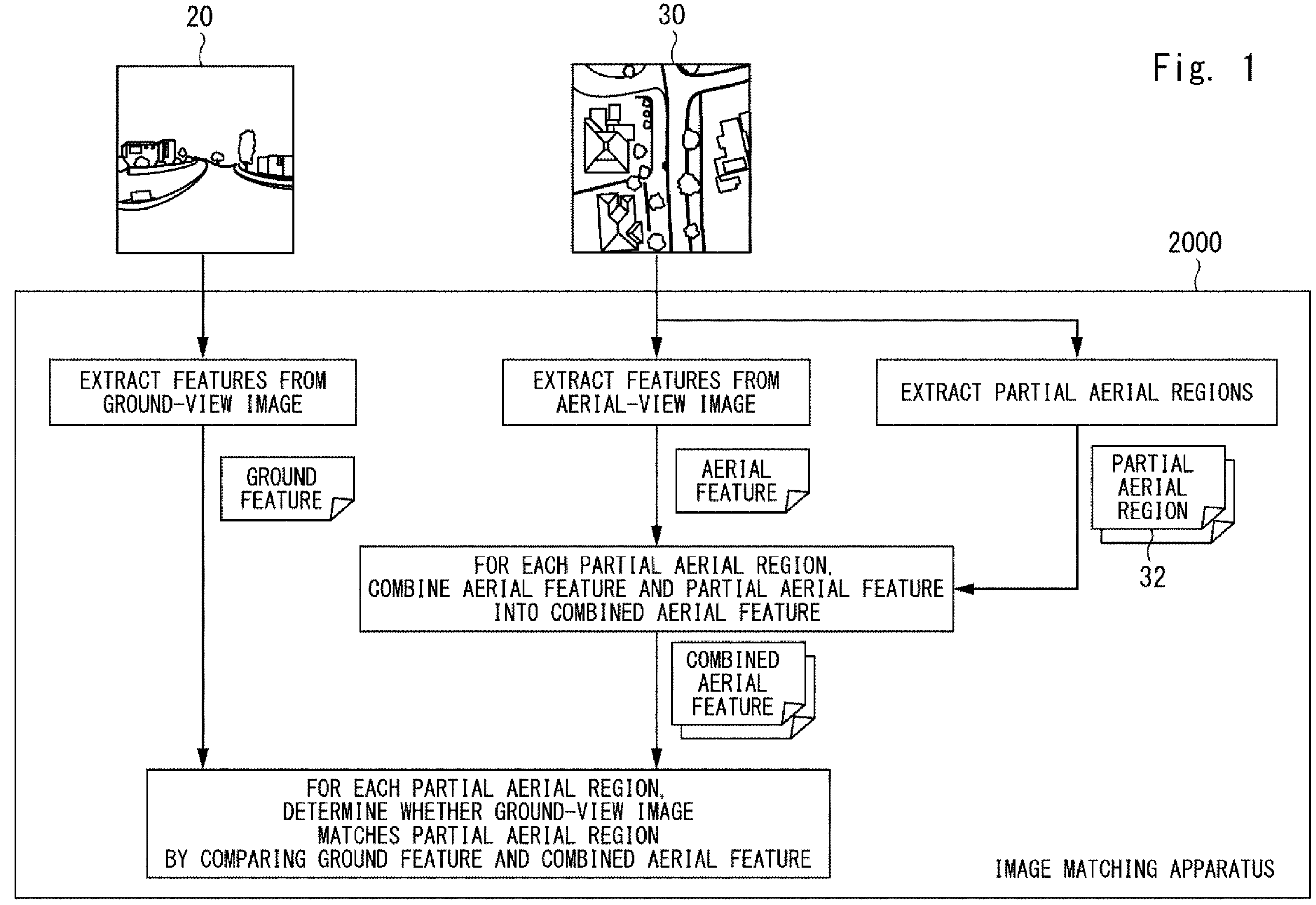
FIG. 1 illustrates an overview of an image matching apparatus 2000 of the 1st example embodiment.

FIG. 1 illustrates an overview of an image matching apparatus 2000 of the first example embodiment. The image matching apparatus 2000 functions as a discriminator that performs matching between a ground-view image 20 and an aerial-view image 30 (so-called ground-to-aerial cross-view matching).

The ground-view image 20 is an image including a ground view of a place. For example, the ground-view image 20 is captured by a camera held by a pedestrian or installed in a car. The ground-view image 20 handled by the image matching apparatus 2000 may have a limited (less than 360-degree) field of view. The aerial-view image 30 is an image including a top view of a place. For example, the aerial-view image 30 is captured by a camera installed in a drone, an air plane, or a satellite.

If the field of view of the ground-view image 20 is less than 360-degree, the ground-view image 20 may not match a whole of an aerial-view image 30, but may match a part of an aerial-view image 30. Thus, the image matching apparatus 2000 acquires a ground-view image 20 and an aerial-view image 30, and determines whether the acquired aerial-view image 30 includes a partial aerial region 32 (i.e. a part of the aerial-view image 30) that matches the acquired ground-view image 20. If the acquired aerial-view image 30 includes a partial aerial region 32 that matches the acquired ground-view image 20, it is determined that the ground-view image 20 matches the aerial-view image 30. On the other hand, if the acquired aerial-view image 30 includes no partial aerial region 32 that matches the acquired ground-view image 20, it is determined that the ground-view image 20 does not match the aerial-view image 30. Note that "a ground-view image matches an aerial-view image" means that a place that is captured in the ground-view image substantially overlaps a place that is captured in the aerial-view image. Similarly, "a ground-view image matches a partial aerial region" means that a place that is captured in the ground-view image substantially overlaps a place that is captured in the partial aerial region.

To realize operations described above, the image matching apparatus 2000 extracts features from each of the ground-view image 20 and the aerial-view image 30. In addition, the image matching apparatus 2000 extracts a plurality of partial aerial regions 32 from the aerial-view image 30, and extracts features from each partial aerial region 32. The features extracted from a ground-view image 20, an aerial-view image 30, and a partial aerial region 32 are called "a ground feature", "an aerial feature", and "a partial aerial feature" respectively. Then, the image matching apparatus 2000 computes, for each partial aerial region 32, a combined aerial feature that is a combination (e.g. a concatenation) of the aerial feature and the partial aerial feature of that partial aerial region 32.

For each partial aerial region 32, the image matching apparatus 2000 determines whether the ground-view image 20 matches the partial aerial region 32 by comparing the ground feature with the combined aerial feature of the partial aerial region 32. When the similarity between the ground feature and the combined aerial feature of the partial aerial region 32 is high enough (e.g. being higher than or equal to a threshold), the image matching apparatus 2000 determines that the ground-view image 20 matches the partial aerial region 32. On the other hand, when their similarity is not high enough (e.g. being less than the threshold), the image matching apparatus 2000 determines that the ground-view image 20 does not match the partial aerial region 32.

If the location where the ground-view image 20 is captured is also captured in the aerial-view image 30, one of the partial aerial regions 32 may be determined to match the ground-view image 20. Thus, there is a partial aerial region 32 that is determined to match the ground-view image 20, the image matching apparatus 2000 determines that the ground-view image 20 matches the aerial-view image 30. On the other hand, if there is no partial aerial regions 32 that is determined to match the ground-view image 20, the image matching apparatus 2000 determines that the ground-view image 20 does not match the aerial-view image 30.

<Example of Advantageous Effect>

According to the image matching apparatus 2000 of the 1st example embodiment, by comparing the combined aerial feature with the ground feature, not only the features of the partial aerial region 32 but also the features of the aerial-view image 30 (in other words, not only local features but also global features) are taken into consideration to determine whether the partial aerial region 32 matches the ground-view image 20. By doing so, it is possible to increase the accuracy of the ground-to-aerial cross-view matching, especially in the cases where the partial aerial region 32 includes objects that are not included in the ground-view image corresponding thereto, or vice versa.

Figure 2:
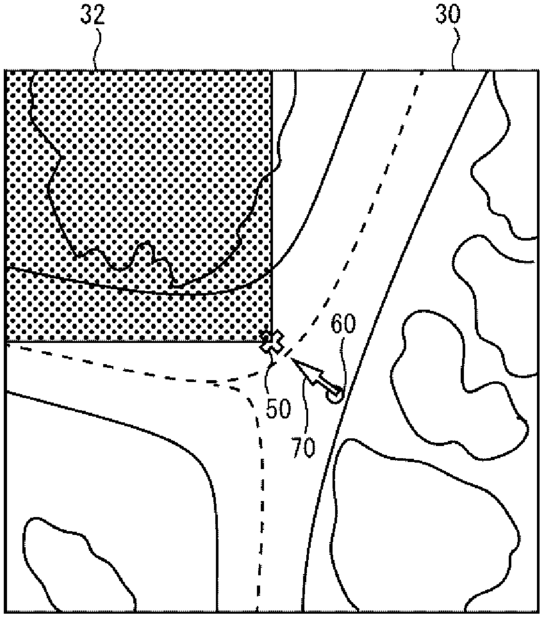
FIG. 2 illustrates a case where the place where the ground-view image is captured does not correspond to the center of the aerial-view image that corresponds to the ground-view image 20.
Figure 2:
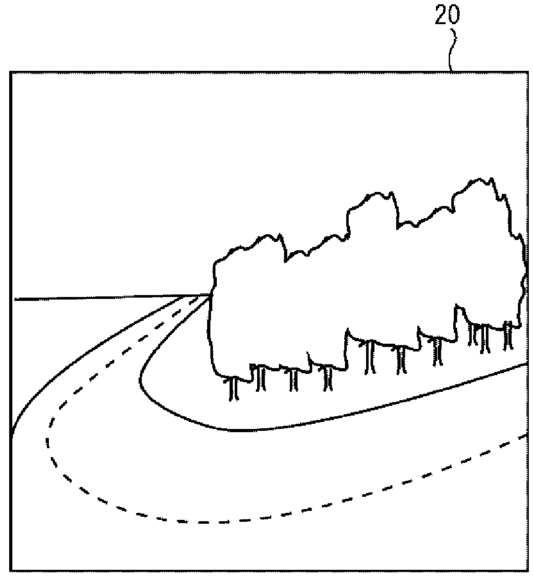

For example, when the place where the ground-view image 20 is captured does not correspond to the center of the aerial-view image 30 corresponding to the ground-view image 20, the ground-view image 20 may include an object that is not included in the partial aerial region 32 corresponding to the ground-view image 20, or vice versa. FIG. 2 illustrates a case where the place where the ground-view image 20 is captured does not correspond to the center of the aerial-view image 30 that corresponds to the ground-view image 20. A cross mark 50 indicates the center of the aerial-view image 30. A circle mark 60 indicates the place where the ground-view image is captured. An arrow 70 indicates a direction to which the camera faced when it captured the ground-view image 20. The partial aerial region 32 depicted in FIG. 2 corresponds to the ground-view image 20.

If the camera is located at the place corresponding to the cross mark 50, the ground-view image 20 includes no broken line drawn on the road. However, since the camera is located at the place corresponding to the circle mark 60, the ground-view image 20 includes a broken line in reality. This broken line could be included in the ground feature extracted from the ground-view image 20, but could not be included in the partial aerial feature extracted from the partial aerial region 32. This may cause substantial difference therebetween.

Regarding this problem, the image matching apparatus 2000 also extracts features from the aerial-view image 30, and those features may include the features of the broken line that are not included in the partial aerial feature. Thus, the combined aerial feature may include the features of the broken line. As a result, the combined aerial feature of the partial aerial region 32 becomes substantially similar to the ground feature, and the ground-view image 20 is determined to match the partial aerial region 32.

In another example, an object may be hidden by another object in a plan view, but may not hidden in a ground view, or vice versa. Suppose that there are trees that cover a part of a road in a plan view, and the road is not be included in a partial aerial region 32. On the other hand, the ground-view image 20 corresponding to the partial aerial region 32 includes not only trees but also the road.

In this case, the ground feature can include features of the road, whereas the partial aerial feature cannot include them. Thus, there could be substantial difference therebetween.

Regarding this problem, the image matching apparatus 2000 also extracts features from the aerial-view image 30, and those features may include the road that are not included in the partial aerial feature. Thus, the combined aerial feature may include the features of the road. As a result, the combined aerial feature becomes substantially similar to the ground feature, and the ground-view image 20 is determined to match the partial aerial region 32.

Hereinafter, more detailed explanation of the image matching apparatus 2000 will be described.

<Example of Functional Configuration>

Figure 3:
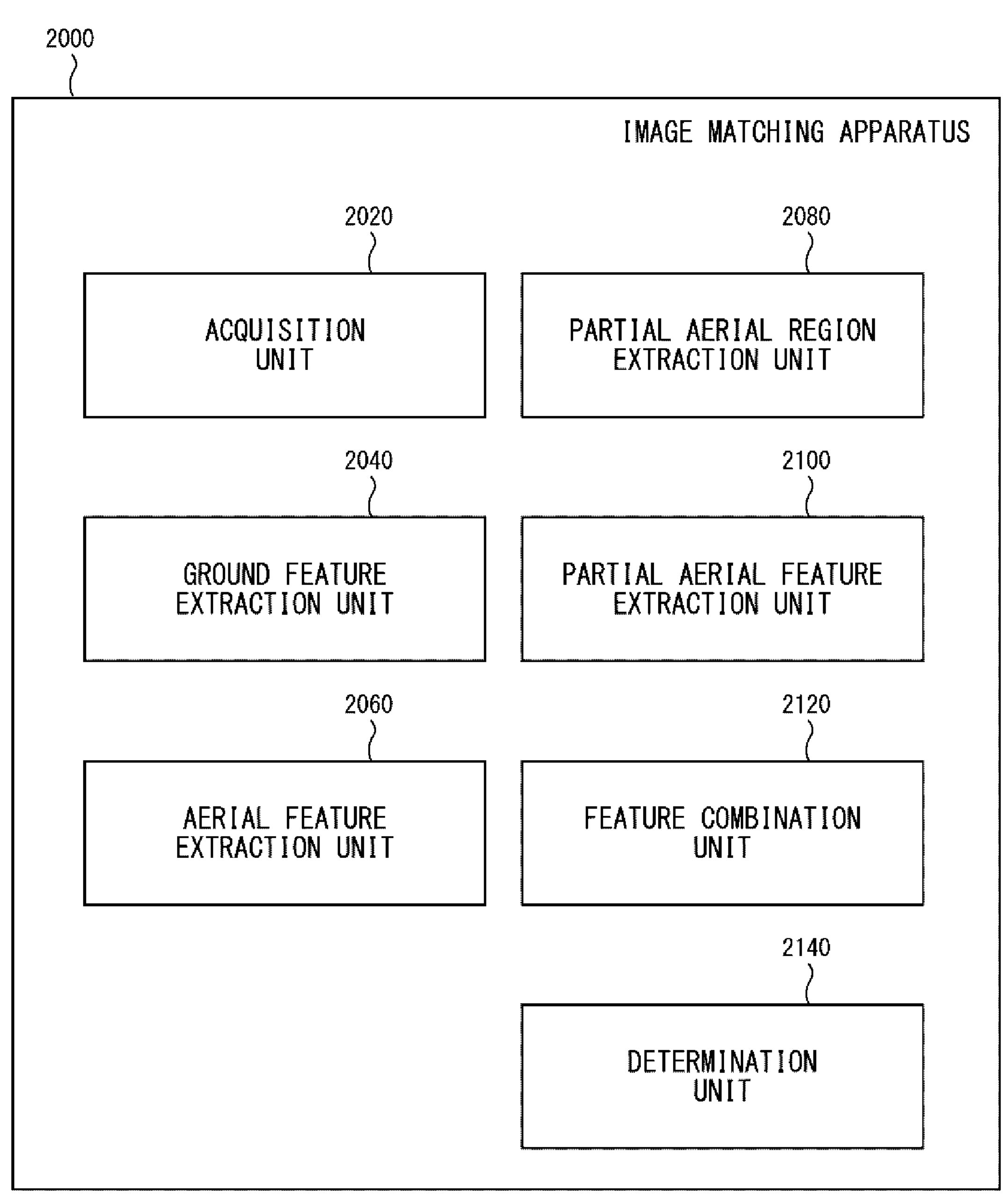
FIG. 3 is a block diagram illustrating an example of a functional configuration of the image matching apparatus.

FIG. 3 is a block diagram showing an example of the functional configuration of the image matching apparatus 2000. The image matching apparatus 2000 includes an acquisition unit 2020, a ground feature extraction unit 2040, a partial aerial region extraction unit 2080, an aerial feature extraction unit 2060, a partial aerial feature extraction unit 2100, a feature combination unit 2120, and a determination unit 2140.

The acquisition unit 2020 acquires the ground-view image 20 and the aerial-view image 30 for which the ground-to-aerial view matching is performed. The ground feature extraction unit 2040 computes the ground feature of the ground-view image 20. The partial aerial region extraction unit 2080 extracts the plurality of the partial aerial regions 32 from the aerial-view image 30. The aerial feature extraction unit 2060 computes the aerial feature of the aerial-view image 30. The partial aerial feature extraction unit 2100 computes the partial aerial feature for each partial aerial feature 32. The feature combination unit 2120 computes the combined aerial feature for each partial aerial region 32, by combining the partial aerial feature of the partial aerial region 32 and the aerial feature of the aerial-view image 30 for each partial aerial region 32. The determination unit 2140 determines, for each partial aerial region 32, whether or not the partial aerial region 32 matches the ground-view image 20 by comparing the combined aerial feature of the partial aerial region 32 with the ground feature of the ground-view image 20.

<Example of Hardware Configuration>

The image matching apparatus 2000 may be realized by one or more computers. Each of the one or more computers may be a special-purpose computer manufactured for implementing the image matching apparatus 2000, or may be a general-purpose computer like a personal computer (PC), a server machine, or a mobile device.

The image matching apparatus 2000 may be realized by installing an application in the computer. The application is implemented with a program that causes the computer to function as the image matching apparatus 2000. In other words, the program is an implementation of the functional units of the image matching apparatus 2000.

Figure 4:
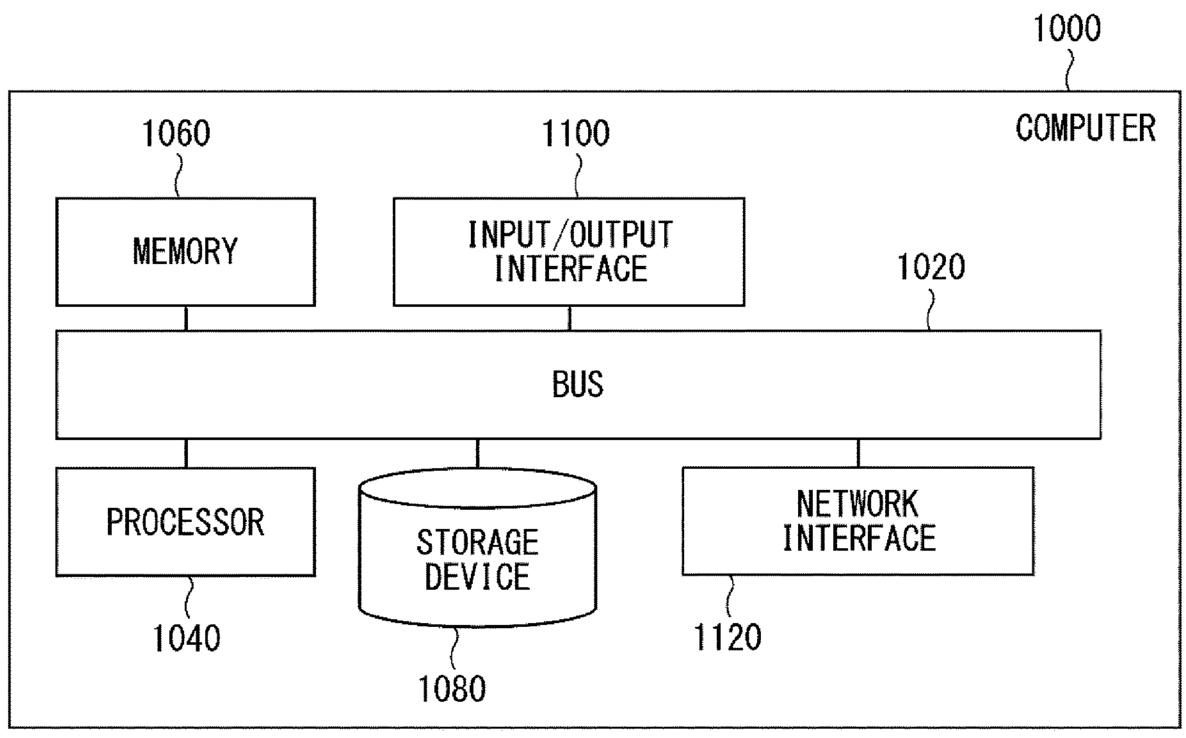
FIG. 4 is a block diagram illustrating an example of a hardware configuration of the image matching apparatus.

FIG. 4 is a block diagram illustrating an example of the hardware configuration of a computer 1000 realizing the image matching apparatus 2000. In FIG. 4, the computer 1000 includes a bus 1020, a processor 1040, a memory 1060, a storage device 1080, an input/output (I/O) interface 1100, and a network interface 1120.

The bus 1020 is a data transmission channel in order for the processor 1040, the memory 1060, the storage device 1080, and the I/O interface 1100, and the network interface 1120 to mutually transmit and receive data. The processor 1040 is a processer, such as a CPU (Central Processing Unit), GPU (Graphics Processing Unit), or FPGA (Field-Programmable Gate Array). The memory 1060 is a primary memory component, such as a RAM (Random Access Memory) or a ROM (Read Only Memory). The storage device 1080 is a secondary memory component, such as a hard disk, an SSD (Solid State Drive), or a memory card. The I/O interface 1100 is an interface between the computer 1000 and peripheral devices, such as a keyboard, mouse, or display device. The network interface 1120 is an interface between the computer 1000 and a network. The network may be a LAN (Local Area Network) or a WAN (Wide Area Network). The storage device 1080 may store the program mentioned above. The processor 1040 executes the program to realize each functional unit of the image matching apparatus 2000.

The hardware configuration of the computer 1000 is not restricted to that shown in FIG. 4. For example, as mentioned-above, the image matching apparatus 2000 may be realized by plural computers. In this case, those computers may be connected with each other through the network.

<Flow of Process>

Figure 5A:
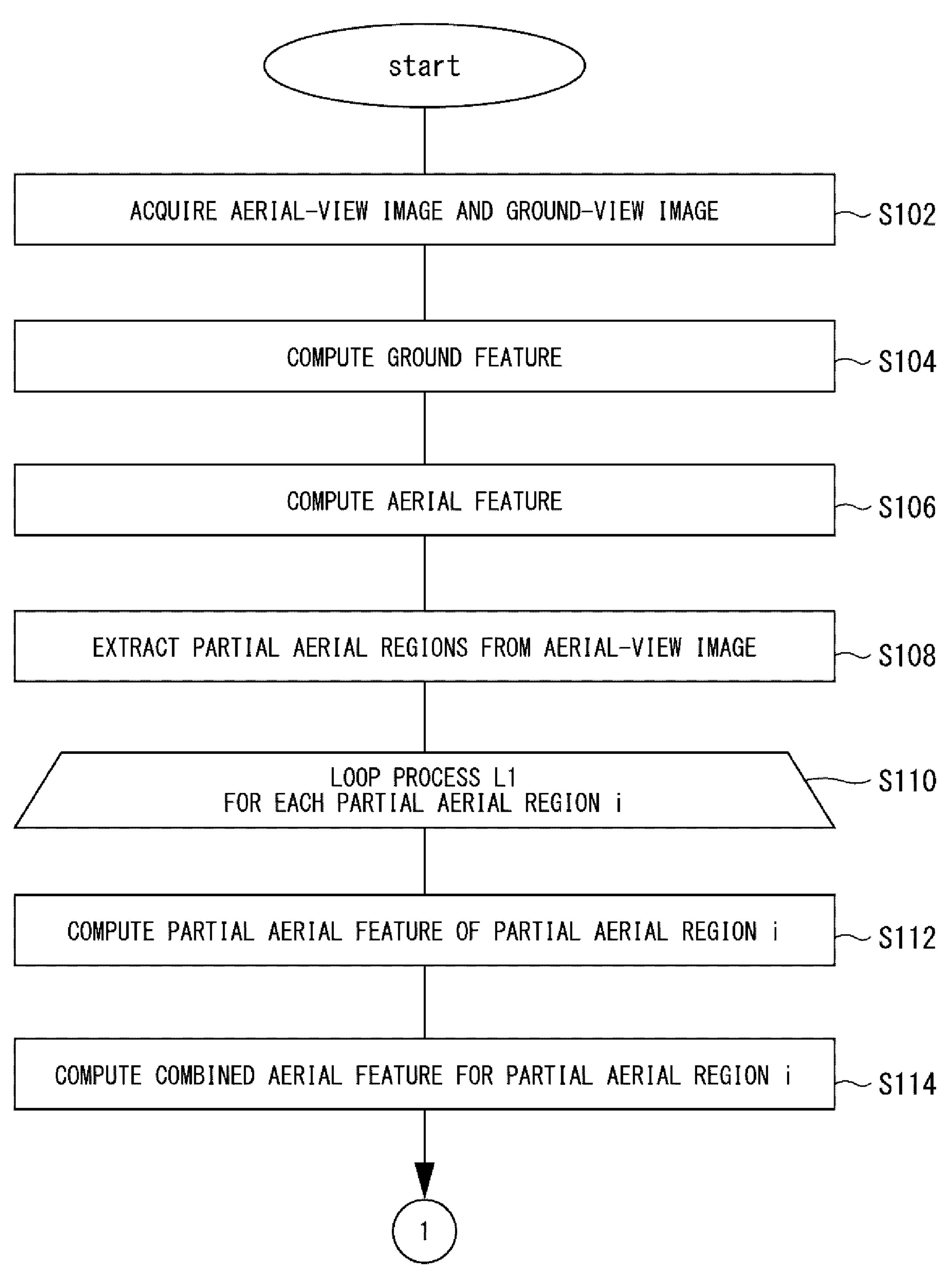
FIG. 5A shows a flowchart illustrating an example flow of processes performed by the image matching apparatus 2000.
Figure 5B:
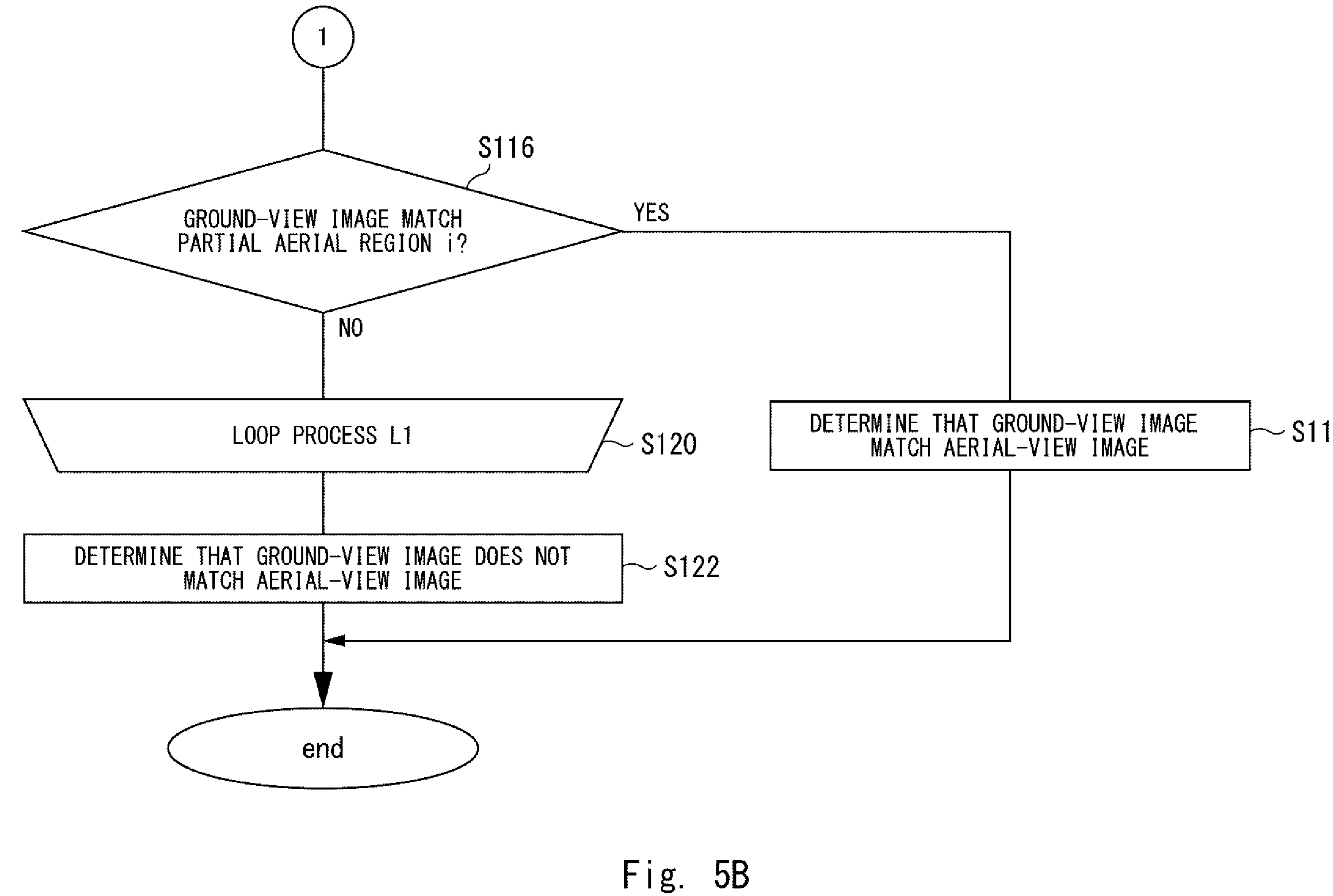
FIG. 5B shows a flowchart illustrating an example flow of processes performed by the image matching apparatus 2000.

FIGS. 5A and 5B show a flowchart illustrating an example flow of processes performed by the image matching apparatus 2000. The acquisition unit 2020 acquires the ground-view image 20 and the aerial-view image 30 (S102). The ground feature extraction unit 2040 computes the ground feature of the ground-view image 20 (S104). The aerial feature extraction unit 2060 computes the aerial feature of the aerial-view image 30 (S106). The partial aerial region extraction unit 2080 extracts a plurality of the partial aerial regions 32 from the aerial-view image 30 (S108).

Step S110 to S120 constitutes a loop process L1 that is performed for each of the partial aerial regions 32. In Step S110, the image matching apparatus 2000 determines whether or not there is one or more partial aerial regions 32 for which the loop process L1 has not been performed yet. When there is no partial aerial region 32 for which the loop process L1 has not been performed yet (i.e. the loop process L1 has already been performed for every partial aerial region 32), the loop process L1 terminates. On the other hand, when there is one or more partial aerial regions 32 for which the loop process L1 has not been performed yet, the image matching apparatus 2000 choses one of the partial aerial regions 32 for which the loop process L1 has not been performed yet. Hereinafter, the partial aerial region 32 chosen here is denoted by the partial aerial region i.

After choosing the partial aerial region i, the partial aerial feature extraction unit 2100 computes the partial aerial feature of the partial aerial region i (S112). The feature combination unit 2120 computes the combined aerial feature for the partial aerial region i by combining the aerial feature of the aerial-view image 30 computed in S105 and the partial aerial feature of the partial aerial region i computed in S112 (S114).

The determination unit 2140 determines whether or not the ground-view image 20 matches the partial aerial region i by comparing the ground feature computed in Step S110 and the combined aerial feature computed in S114 (S116). If it is determined that the ground-view image 20 matches the partial aerial region i (S116: YES), the determination unit 2140 determines that the ground-view image 20 matches the aerial-view image 30 (S118). Then, the flow illustrated in FIG. 5 terminates. On the other hand, if it is determined that the ground-view image 20 does not match the partial aerial region i (S116: NO), the current iteration of the loop process L1 terminates (S120), and then Step S110 is performed again.

In the case where none of the partial aerial regions 32 is determined to match the ground-view image 20, Step S122 is performed. Since there is no partial aerial region 32 that matches the ground-view image 20, the determination unit 2140 determines that the ground-view image 20 does not match the aerial-view image 30 (S122).

The flow shown in FIG. 5 is a merely example of a flow of operations performed by the image matching apparatus 2000, and the flow of operation is not restricted to one shown in FIG. 5. For example, it is not necessary for the image matching apparatus 2000 to determine whether or not the ground-view image 20 matches the partial aerial region 32 in each iteration of the loop process L1. Instead of doing so, the image matching apparatus 2000 may compute a degree of similarity between the ground feature and the combined aerial feature in each iteration of the loop process L1, and determine the combined aerial feature having the largest degree of similarity to the ground feature. Then, the image matching apparatus 2000 determines whether or not the ground-view image 20 matches the partial aerial region 32 that is determined to have the largest degree of similarity to the ground feature.

<Example Application of Image Matching Apparatus 2000>

There are various possible applications of the image matching apparatus 2000. For example, the image matching apparatus 2000 can be used as a part of a system (hereinafter, a geo-localization system) that performs image geo-localization. Image geo-localization is a technique to determine the place at which an input image is captured. Note that, the geo-localization system is merely an example of the application of the image matching apparatus 2000, and the application of the image matching apparatus 2000 is not restricted to being used in the geo-localization system.

Figure 6:
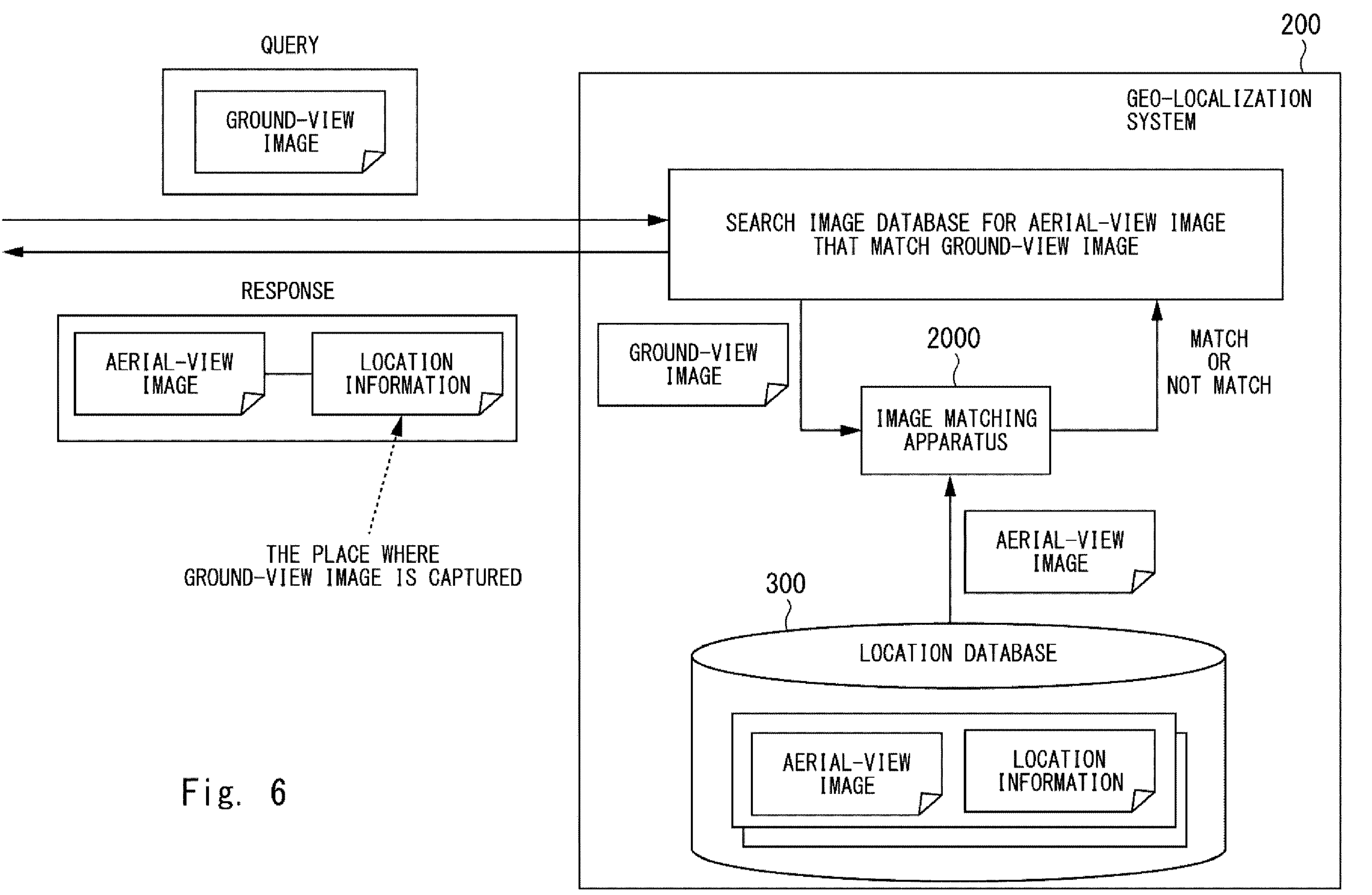
FIG. 6 illustrates a geo-localization system that includes the discriminator.

FIG. 6 illustrates a geo-localization system 200 that includes the image matching apparatus 2000. The geo-localization system 200 includes the image matching apparatus 2000 and the location database 300. The location database 300 includes a plurality of aerial-view images to each of which location information is attached. An example of the location information may be a GPS (Global Positioning System) coordinate of the place captured in the center of the corresponding aerial-view image.

The geo-localization system 200 receives a query that includes a ground-view image from a client (e.g. user terminal), and searches the location database 300 for the aerial-view image that matches the ground-view image in the received query, thereby determining the place at which the ground-view image is captured. Specifically, until the aerial-view image that matches the ground-view image in the query is detected, the geo-localization system 200 repeatedly executes to: acquire one of the aerial-view images from the location database 300; input the ground-view image and the acquired aerial-view image into the image matching apparatus 2000; and determine whether the output of the image matching apparatus 2000 indicates that the ground-view image matches the aerial-view image. By doing so, the geo-localization system 200 can find the aerial-view image that includes the place at which the ground-view image is captured. Since the detected aerial-view image is associated with the location information such as the GPS coordinate, the geo-localization system 200 can recognize that where the ground-view image is captured is the place that is indicated by the location information associated with the aerial-view image that matches the ground-view image.

Note that the geo-localization system 200 may be implemented by one or more arbitrary computers such as ones depicted in FIG. 4.

<Acquisition of Images: S102>

The acquisition unit 2020 acquires the ground-view image 20 and the aerial-view image 30 (S102). There are various ways to acquire those images. For example, the acquisition unit 2020 may receive a set of the ground-view image 20 and the aerial-view image 30 sent from another computer. In another example, the acquisition unit 2020 may retrieve a set of the ground-view image 20 and the aerial-view image 30 from a storage device to which it has access.

In another example, as illustrated in FIG. 6, the acquisition unit 2020 may receive the ground-view image 20 sent from another computer, and search for the aerial-view image that matches the ground-view image 20. In this case, the acquisition unit 2020 repeatedly acquires the aerial-view images 30 from a storage device until the aerial-view image 30 matching the ground-view image 20 is found, or until it is determined that there is no aerial-view image 30 that matches the ground-view image 20. Similarly, the acquisition unit 2020 may receive the aerial-view image 30 sent from another computer, and search for the ground-view image 20 that matches the aerial-view image 30.

<Feature Extraction from Ground-View Image: S104>

The ground feature extraction unit 2040 computes the ground feature of the ground-view image 20 (S104). The ground feature of the ground-view image 20 is the features extracted from that ground-view image 20. There exist various ways to extract features from an image, and any one of them may be employed to form the ground feature extraction unit 2040. For example, the ground feature extraction unit 2040 may be realized by a machine learning-based model, such as a neural network. More specifically, a feature extraction layer of CNN (Convolutional Neural Network) may be employed to form the ground feature extraction unit 2040.

<Extraction of Partial Aerial Region 32: S108>

Figure 7:
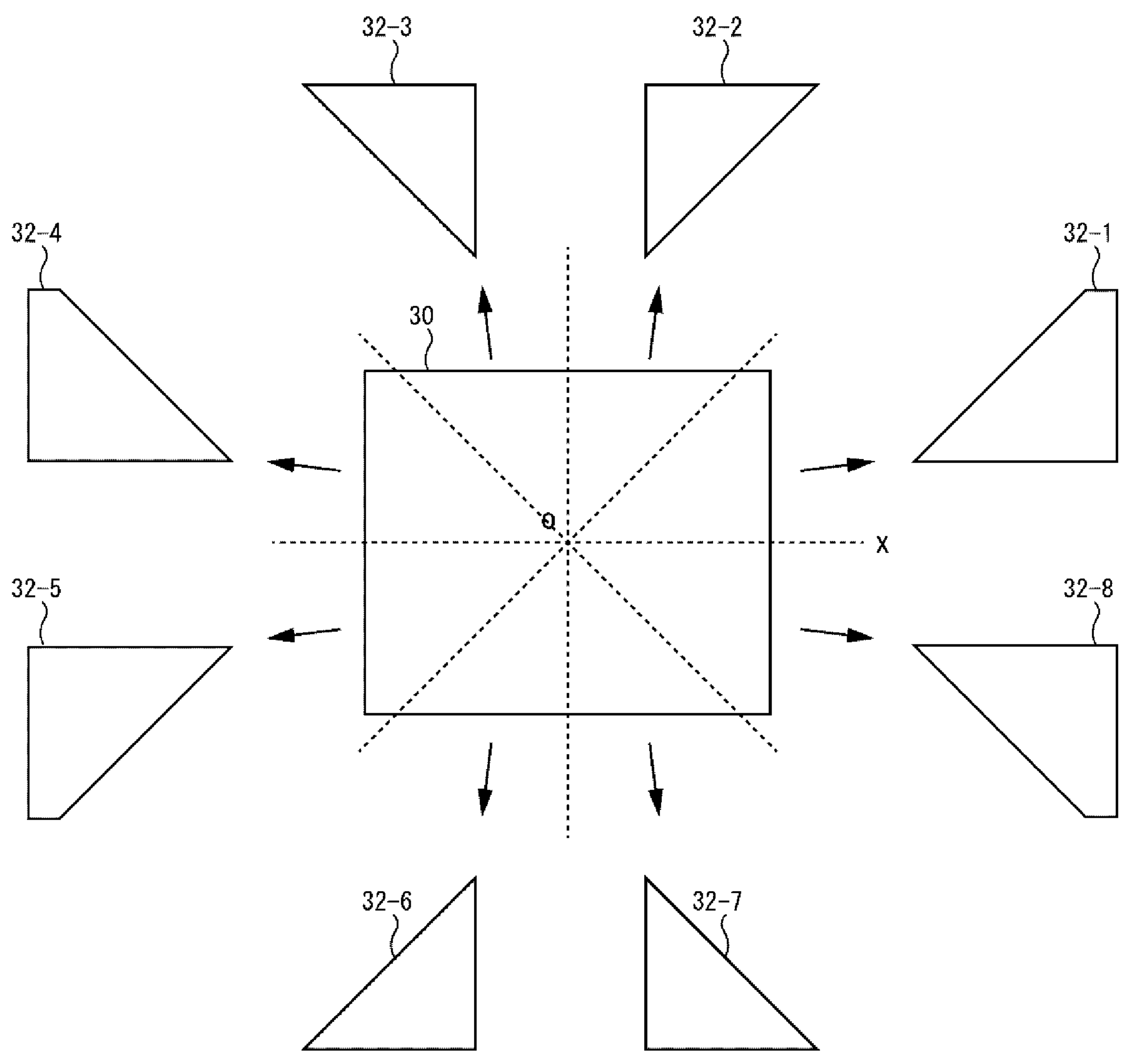
FIG. 7 illustrates the partial aerial regions that are obtained using radial lines.

The partial aerial region extraction unit 2080 extracts a plurality of partial aerial regions 32 from the aerial-view image 30 (S108). There are various ways to extract the partial aerial regions 32 from the aerial-view image 30. For example, the partial aerial region extraction unit 2080 divides the aerial-view image 30 into multiple partial aerial regions 32 using radial lines. FIG. 7 illustrates the partial aerial regions 32 that are obtained using radial lines. In FIG. 7, the center of the aerial-view image 30 is set as the origin, and multiple radial lines are drawn from the center of the aerial-view image 30. In addition, the size of an angle between two radial lines adjacent to each other is 45°. As a result, eight partial aerial regions 32-1 to 32-8 are extracted from the aerial-view image 30.

The size of the angle between two adjacent radial lines may be set in advance, may be specified by a user of the image matching apparatus 2000, or may be determined based on the size of the field of view of the ground-view image 20. It is preferable that the size of the angle between two adjacent radial lines is set to be same as the size of the field of view of the ground-view image 20. For example, when the size of the field of view of the ground-view image 20 is 45°, it is preferable that the size of the angle between two adjacent radial lines is set as 45°.

There are various ways to recognize the size of the field of view of the ground-view image 20. For example, the size of the field of view may be indicated by a metadata of the ground-view image 20. In this case, the image matching apparatus 2000 reads the metadata of the ground-view image 20 to recognize the size of the field of view of the ground-view image 20, and uses the recognized size as the size of the angle between two adjacent radial lines. In another example, the image matching apparatus 2000 may acquire information describing the size of the field of view of the ground-view image 20.

The partial aerial region extraction unit 2080 may use multiple sizes for the angle between two adjacent radial lines. Suppose that 45° and 60° are used as the angle between two adjacent radial lines. In this case, for example, the partial aerial region extraction unit 2080 set the angle between two adjacent radial lines as 45° first, and extracts 8 partial aerial regions 32. Next, the partial aerial region extraction unit 2080 set the angle between two adjacent radial lines as 60°, and extracts 6 partial aerial regions 32. As a result, the partial arial region extraction unit 2080 obtains 14 partial aerial regions 32 in total. By employing this way, the image matching apparatus 2000 may find the partial aerial regions 32 that matches the ground-view image 20 without knowledge on the field of view of the ground-view image 20.

The partial aerial region extraction unit 2080 may extracts the partial aerial regions 32 in such a manner that a part of a partial aerial region 32 overlaps a part of one or more partial aerial regions 32. In this case, for instance, the partial aerial region extraction unit 2080 may use a sliding window method to define radial lines by which a partial aerial region 32 is extracted from the aerial-view image 30. Hereinafter, two radial lines by which a partial aerial region 32 is extracted from the aerial-view image 30 are called "a first radial line" and "a second radial line" respectively. Note that the angle between the first radial line and the x axis is smaller than the angle between the second radial line and the x axis.

In this case, for each partial aerial region 32, the partial aerial region extraction unit 2080 may define the first radial line and the second radial line as follows:

Equation 1

$$\alpha[i]=i^*(s-1)\ (0\leq\alpha[i]<360°)\quad \beta[i]=\alpha+w\ (0<\beta[i]<360°) \tag{1}$$

In the equation (1), α[i] represents the angle between the first radial line defining the i-th partial aerial region 32 and the x axis; β[i] represents the angle between the second radial line defining the i-th partial aerial region 32 and the x axis; s represents the size of stride of the sliding window, i.e. the angle between two adjacent partial aerial regions 32; and w represents the size of the sliding window, i.e. the angle between the first radial line and the second radial line.

Figure 8:
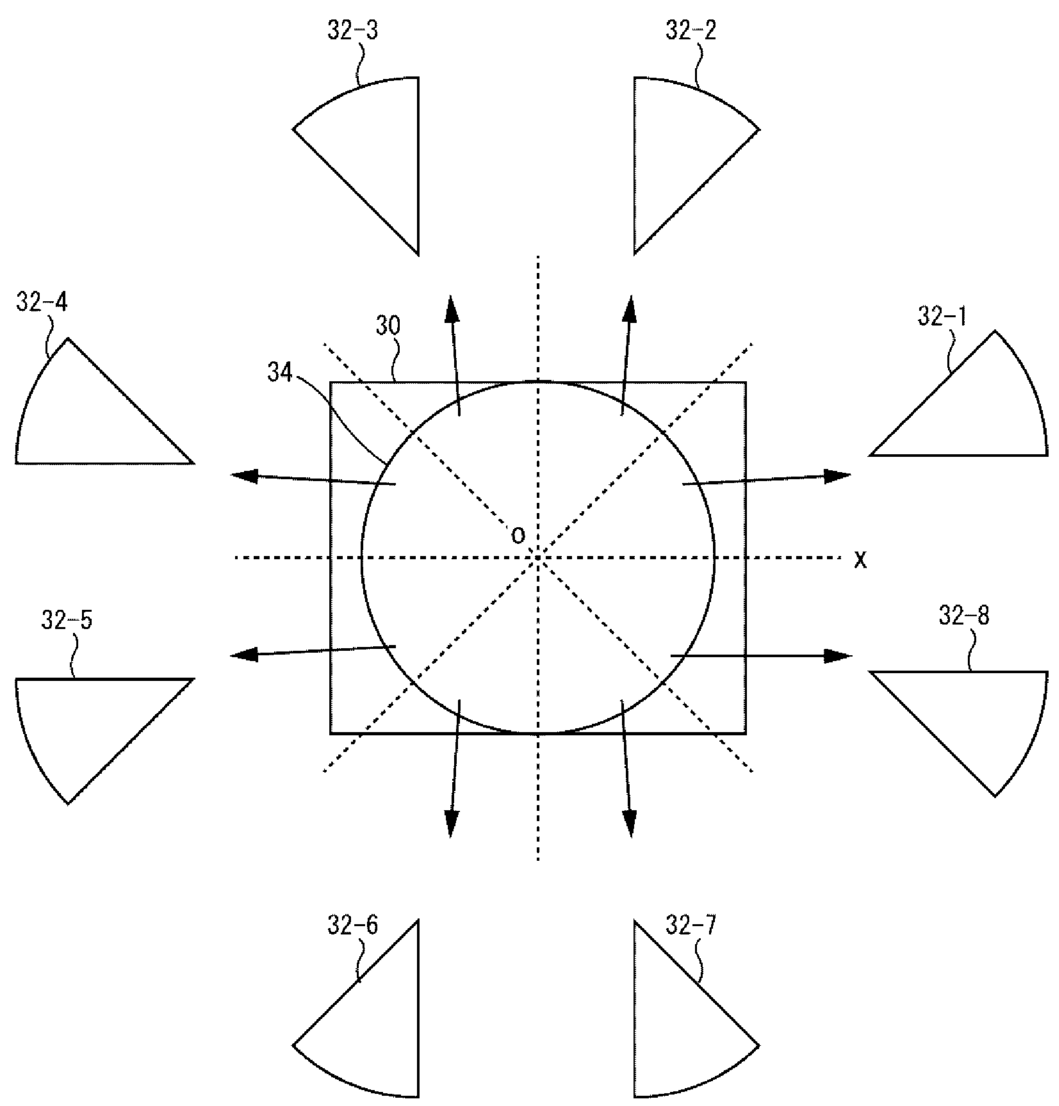
FIG. 8 illustrates the case where the partial regions are extracted from a circular region in the aerial-view image.

Instead of extracting partial aerial regions 32 from a whole of the aerial-view image 30, the partial aerial region extraction unit 2080 may extract partial aerial regions 32 from a part of the aerial-view image 30. For example, the partial aerial region extraction unit 2080 crops a circular region out of the aerial-view image 30, and then extract the plurality of partial aerial regions 32 from the circular region using radial lines. By doing so, it is possible to obtain the plurality of partial aerial regions 32 having the size and shape same as each other. FIG. 8 illustrates the case where the partial regions 32 are extracted from a circular region in the aerial-view image 30. In FIG. 8, the circular region 34 is a circle inscribed in the arial-view image 30, and its center corresponds to the center of the aerial-view image 30.

<Feature Extraction from Aerial-View Image 30: S106, S112, S114>

The image matching apparatus 2000 computes the combined aerial feature for each partial aerial region 32. The combined aerial feature of the partial aerial region 32 is the combination of the aerial feature of the aerial-view image 30 and the partial aerial feature of that partial aerial region 32.

Regarding computation of the aerial feature of the aerial-view image 30, similar to the computation of the ground feature of the ground-view image 20, it is possible to employ any one of various ways of extracting features of an image. For example, the aerial feature extraction unit 2060 may be realized by a machine learning-based model, such as a neural network. Specifically, a feature extraction layer of a CNN may be employed to form the aerial feature extraction unit 2060.

Computation of the partial aerial feature of the partial aerial region 32 may also be realized in a manner similar to the computation of the ground feature and the computation of the aerial feature. Specifically, it is possible to employ any one of various ways of extracting features of an image. For example, the partial aerial feature extraction unit 2100 may be realized by a machine learning-based model, such as a neural network. More specifically, a feature extraction layer of a CNN may be employed to form the partial aerial feature extraction unit 2100.

Note that the partial aerial feature extraction unit 2100 may rotate the partial aerial region 32 so that the first radial line thereof becomes parallel to the x axis. Suppose that the angle between the first radial line of the partial aerial region 32 and the x axis is 45°. In this case, the partial aerial feature extraction unit 2100 may rotate the partial aerial region 32 by 45° clockwise.

In this case, the aerial-view image 30 may be rotated by the same angle as the partial aerial region 32. In this case, different aerial feature is computed for each partial aerial region 32. For example, there are a partial aerial region R1 whose first radial line makes 45° with the x axis, and a partial aerial region R2 whose first radial line makes 60° with the x axis. When computing the combined aerial feature for the partial aerial region R1, the aerial-view image 30 and the partial aerial region R1 may be rotated by 45° clockwise before computing their features. On the other hand, when computing the combined aerial feature for the partial aerial region R2, the aerial-view image 30 and the partial aerial region R2 may be rotated by 60° clockwise before computing their features.

After obtaining the partial aerial feature from the partial aerial region 32 and the aerial feature from the aerial-view image 30, the feature combination unit 2120 combines them into the combined aerial feature. There are various ways to combine two sets of features into a single set of ones. For example, the feature combination unit 2120 concatenates the partial aerial feature and the aerial feature, and uses this concatenation as the combined aerial feature. In this case, the aerial feature and the partial aerial feature are formed in a manner that the sum of their sizes is equal to the size of the ground feature.

Suppose that the ground feature extraction unit 2040, the aerial feature extraction unit 2060, and the partial aerial feature extraction unit 2100 are realized by neural networks. In this case, they may be formed in a manner that the size of the output layer of the ground feature extraction unit 2040 is equal to the sum of the size of the output layer of the aerial feature extraction unit 2060 and the size of the output layer of the partial aerial feature extraction unit 2100.

In another example, the feature combination unit 2120 computes a weighted sum of the partial aerial feature and the aerial feature, and uses this weighted sum as the combined aerial feature. In this case, the aerial feature and the partial aerial feature are formed in a manner that the size of the aerial feature and the size of the partial aerial feature are same as each other, and are equal to the size of the ground feature.

Suppose that the ground feature extraction unit 2040, the aerial feature extraction unit 2060, and the partial aerial feature extraction unit 2100 are realized by neural networks. In this case, they may be formed in a manner that the size of the output layer of each of the units is equal to each other.

The weighted sum of the partial aerial feature and the aerial feature may be computed using a neural network. This neural network is formed to feed the aerial feature and the partial aerial feature, and output the weighted sum of them. The weights can be determined through training of the neural network.

<Matching Ground-View Image Against Partial Aerial Region: S116>

The determination unit 2140 determines whether the ground-view image 20 matches the partial aerial region 32 by comparing the ground feature with the combined aerial feature of that partial aerial region 32 (S116). In order for the comparison, for example, the determination 2140 computes the similarity score that indicates a degree of similarity between the ground-view image 20 and the partial aerial region 32.

Various metrics can be used to compute the similarity score. For example, the similarity score may be computed as one of various types of distance (e.g. L2 distance), correlation, cosine similarity, or NN (neural network) based similarity. The NN based similarity is the degree of similarity computed by a neural network that is trained to compute the degree of similarity between two input data (in this case, the ground feature and the combined aerial feature).

The determination unit 2140 determines whether the ground-view image 20 matches the partial aerial region 32 based on the similarity score. Conceptually, the higher the degree of similarity between the ground-view image 20 and the partial aerial region 32 is, the higher the possibility of that the ground-view image 20 matches the partial aerial region 32. Therefore, for example, the determination unit 2140 determines whether or not the similarity score is equal to or larger than a predefined threshold. If the similarity score is equal to or larger than the predefined threshold, the determination unit 2140 determines that the ground-view image 20 matches the partial aerial region 32. On the other hand, if the similarity score is less than a predefined threshold, the determination unit 2140 determines that the ground-view image 20 does not match the partial aerial region 32.

Note that, in the case mentioned above, the similarity score is assumed to become larger as the degree of similarity between the ground feature and the combined aerial feature becomes higher. Thus, if a metric such as a distance with which a value computed for the ground feature and the combined aerial feature becomes less as the degree of similarity between the ground feature and the combined aerial feature becomes higher is used, the similarity score may be defined as the reciprocal of the value computed for the ground feature and the combined aerial feature (e.g. the distance between the ground feature and the combined aerial feature).

In another example, in the case where the similarity score becomes less as the degree of similarity between the ground feature and the combined aerial feature becomes higher, the determination unit 2140 may determine whether the similarity score is equal to or less than a predefined threshold. If the similarity score is equal to or less than the predefined threshold, the determination unit 2140 determines that the ground-view image 20 matches the partial aerial region 32. On the other hand, if the similarity score is larger than the predefined threshold, the determination 2140 determines that the ground-view image 20 does match the partial aerial region 32.

<Output from Image Matching Apparatus 2000>

The image matching apparatus 2000 may output information (hereinafter, output information) indicating a result of the determination. For example, the output information may indicate whether or not the ground-view image 20 matches the aerial-view image 30. In the case whether the ground-view image 20 matches the aerial-view image 30, the output information may further include information that identifies the partial aerial region 32 that is determined to match the ground-view image 20. The partial aerial region 32 may be identified by, for example, the image data thereof, or the set of an angle between the first radial line and the x axis and an angle between the second radial line and the x axis. In addition, the output information may include the size of the field of view of the ground-view image 20.

There are various ways to output the output information. For example, the image matching apparatus 2000 may put the output information into a storage device. In another example, the image matching apparatus 2000 may output the output information to a display device so that the display device displays the contents of the output information. In another example, the image matching apparatus 2000 may output the output information to another computer, such as one included in the geo-localization system 200 shown in FIG. 6.

<Training of Models>

The image matching apparatus 2000 may include one or more machine learning-based models, such as neural networks. For example, as described above, the ground feature extraction unit 2040, the aerial feature extraction unit 2060, the partial aerial feature extraction unit 2100, and the feature combination unit 2120 may be implemented as neural networks (e.g. feature extraction layers of CNN). When the image matching apparatus 2000 is implemented with the machine learning-based models, those models have to be trained in advance using training datasets. For example, a computer (hereinafter, training apparatus) that trains the models may compute a triplet loss using a training dataset, and updates trainable parameters of the models based on the triplet loss. In this case, the training dataset may include a ground-view image, an aerial-view image, and a positive example of the partial aerial region that matches the ground-view image, and a negative example of the partial aerial region that does not match the ground-view image. The ground-view image, the positive example of the partial aerial region, and the negative example of the partial aerial region are used as an anchor input, a positive input, and a negative input respectively.

Specifically, for example, the training apparatus inputs the ground-view image into the ground-feature extraction unit 2040 to obtain the ground feature, inputs the aerial-view image into the aerial feature extraction unit 2060 to obtain the aerial feature, input the positive example of the partial aerial region into the partial aerial feature extraction unit 2100 to obtain the partial aerial feature corresponding to the positive example, and input the negative example of the partial aerial region into the partial aerial feature extraction unit 2100 to obtain the partial aerial feature corresponding to the negative example. Then, the aerial feature and the partial aerial feature corresponding to the positive example are input into the feature combination unit 2120 to obtain the combined aerial feature corresponding to the positive example. Similarly, the aerial feature and the partial aerial feature corresponding to the negative example are input into the feature combination unit 2120 to obtain the combined aerial feature corresponding to the negative example.

Next, the training apparatus computes a triplet loss based on the ground feature, the combined aerial feature corresponding to the positive example, and the combined aerial feature corresponding to the negative example. Then, the training apparatus updates trainable parameters of the models based on the obtained triplet loss. Note that there are various wall-known ways to update trainable parameters of one or more machine learning-based models based on a triplet loss computed based on the outputs from those models, and any one of them can be employed in the training apparatus. In addition, a triplet loss is a merely example of a loss capable of being used to train the models, and any other types of loss may be used to train the models.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present disclosure is explained above with reference to example embodiments, the present disclosure is not limited to the above-described example embodiments. Various modifications that can be understood by those skilled in the art can be made to the configuration and details of the present disclosure within the scope of the invention.

The whole or part of the example embodiments disclosed above can be described as, but not limited to, the following supplementary notes.

SUPPLEMENTARY NOTES (Supplementary Note 1)

An image matching apparatus comprising:
at least one processor; and
memory storing instructions,
wherein the at least one processor is configured to execute the instructions to:
acquire a ground-view image and an aerial-view image;
extract features from the ground-view image;
extract features from the aerial-view image;
extract a plurality of partial aerial regions from the aerial-view image;
extract features from each of the plurality of the partial aerial regions; for each of the plurality of the partial aerial regions, compute a combined aerial feature by combining the features of the partial aerial region and the features of the aerial-view image; and
for each of the plurality of the partial aerial regions, determine whether the partial aerial region matches the ground-view image by comparing the combined aerial feature of the partial aerial region and the features of the ground-view image.

(Supplementary Note 2)

The image matching apparatus according to supplementary note 1, wherein the at least one processor is further configured to determine that the ground-view image matches the aerial-view image in the case where the partial aerial region is determined to match the ground-view image.

(Supplementary Note 3)

The image matching apparatus according to supplementary note 1 or 2, wherein the determination of whether the partial aerial region matches the ground-view image includes:
computing a degree of similarity between the combined aerial feature of the partial aerial region and the features of the ground-view image; and
determining whether the computed degree of similarity is equal to or larger than a predefined threshold.

(Supplementary Note 4)

The image matching apparatus according to any one of supplementary notes 1 to 3,
wherein the extraction of the plurality of partial aerial regions includes to divide the aerial-view image into the plurality of partial aerial regions using a plurality of radial lines.

(Supplementary Note 5)

The image matching apparatus according to any one of supplementary notes 1 to 4,
wherein the extraction of the plurality of partial aerial regions includes: cropping a circular region out of the aerial-view image; and
dividing the circular region into the plurality of partial aerial regions.

(Supplementary Note 6)

The image matching apparatus according to any one of supplementary notes 1 to 5,
wherein the combined aerial feature is a concatenation of the features of the partial aerial region and the features of the aerial-view image, or the combined aerial feature is a weighed sum of the features of the partial aerial region and the features of the aerial-view image.

(Supplementary Note 7)

A control method performed by a computer, comprising:
acquiring a ground-view image and an aerial-view image;
extracting features from the ground-view image;
extracting features from the aerial-view image;
extracting a plurality of partial aerial regions from the aerial-view image;
extracting features from each of the plurality of the partial aerial regions;

for each of the plurality of the partial aerial regions, computing a combined aerial feature by combining the features of the partial aerial region and the features of the aerial-view image; and for each of the plurality of the partial aerial regions, determining whether the partial aerial region matches the ground-view image by comparing the combined aerial feature of the partial aerial region and the features of the ground-view image.

(Supplementary Note 8)

The control method according to supplementary note 7, further comprising:

determining that the ground-view image matches the aerial-view image in the case where the partial aerial region is determined to match the ground-view image.

(Supplementary Note 9)

The control method according to supplementary note 7 or 8, wherein the determination of whether the partial aerial region matches the ground-view image includes:

computing a degree of similarity between the combined aerial feature of the partial aerial region and the features of the ground-view image; and determining whether the computed degree of similarity is equal to or larger than a predefined threshold.

(Supplementary Note 10)

The control method according to any one of supplementary notes 7 to 9, wherein the extraction of the plurality of partial aerial regions includes to divide the aerial-view image into the plurality of partial aerial regions using a plurality of radial lines.

(Supplementary Note 11)

The control method according to any one of supplementary notes 7 to 10, wherein the extraction of the plurality of partial aerial regions includes: cropping a circular region out of the aerial-view image; and dividing the circular region into the plurality of partial aerial regions.

(Supplementary Note 12)

The control method according to any one of supplementary notes 7 to 11, wherein the combined aerial feature is a concatenation of the features of the partial aerial region and the features of the aerial-view image, or the combined aerial feature is a weighed sum of the features of the partial aerial region and the features of the aerial-view image.

(Supplementary Note 13)

A non-transitory computer-readable storage medium storing a program that causes a computer to execute:

acquiring a ground-view image and an aerial-view image;

extracting features from the ground-view image;

extracting features from the aerial-view image;

extracting a plurality of partial aerial regions from the aerial-view image;

extracting features from each of the plurality of the partial aerial regions;

for each of the plurality of the partial aerial regions, computing a combined aerial feature by combining the features of the partial aerial region and the features of the aerial-view image; and for each of the plurality of the partial aerial regions, determining whether the partial aerial region matches the ground-view image by comparing the combined aerial feature of the partial aerial region and the features of the ground-view image.

(Supplementary Note 14)

The storage medium according to supplementary note 13, wherein the program causes the computer to further execute:

determining that the ground-view image matches the aerial-view image in the case where the partial aerial region is determined to match the ground-view image.

(Supplementary Note 15)

The storage medium according to supplementary note 13 or 14, wherein the determination of whether the partial aerial region matches the ground-view image includes:

computing a degree of similarity between the combined aerial feature of the partial aerial region and the features of the ground-view image; and determining whether the computed degree of similarity is equal to or larger than a predefined threshold.

(Supplementary Note 16)

The storage medium according to any one of supplementary notes 13 to 15, wherein the extraction of the plurality of partial aerial regions includes to divide the aerial-view image into the plurality of partial aerial regions using a plurality of radial lines.

(Supplementary Note 17)

The storage medium according to any one of supplementary notes 13 to 16, wherein the extraction of the plurality of partial aerial regions includes:

cropping a circular region out of the aerial-view image; and dividing the circular region into the plurality of partial aerial regions.

(Supplementary Note 18)

The storage medium according to any one of supplementary notes 13 to 17, wherein the combined aerial feature is a concatenation of the features of the partial aerial region and the features of the aerial-view image, or the combined aerial feature is a weighed sum of the features of the partial aerial region and the features of the aerial-view image.

REFERENCE SIGNS LIST

20 ground-view image
30 aerial-view image
32 partial aerial region
34 circular region
50 cross mark
60 circle mark
70 arrow
200 geo-localization system
300 location database
1000 computer
1020 bus
1040 processor
1060 memory
1080 storage device
1100 input/output interface
1120 network interface
2000 image matching apparatus
2020 acquisition unit
2040 ground feature extraction unit
2060 aerial feature extraction unit
2080 partial aerial region extraction unit
2100 partial aerial feature extraction unit
2120 feature combination unit
2140 determination unit

What is claimed is:

1. A computer based cross-view image matching apparatus comprising:

at least one processor; and memory storing instructions; and, at least one processor that is configured to execute the instructions to:

acquire a ground-view image and an aerial-view image;

extract features from the ground-view image;

extract features from the aerial-view image;

extract a plurality of partial aerial regions from the aerial-view image;

extract features from each of the plurality of partial aerial regions;

for each of the plurality of partial aerial regions, compute a combined aerial feature by combining the features of the partial aerial region and the features of the aerial-view image; and for each of the plurality of partial aerial regions, determine whether the partial aerial region matches the ground-view image by comparing the combined aerial feature of the partial aerial region and the features of the ground-view image, wherein the features from the ground-view image, the features from the aerial-view image and the features from each of the plurality of partial aerial regions are extracted based on one or more models, and wherein the comparing the combined aerial feature of the partial aerial region and the features of the ground-view image comprises:

computing a degree of similarity between the combined aerial feature of the partial aerial region and the features of the ground-view image; and determining that the partial aerial region matches the ground-view image based on a determination that the computed degree of similarity is equal to or larger than a predefined threshold.

2. The image matching apparatus according to claim 1, wherein the at least one processor is further configured to determine that the ground-view image matches the aerial-view image in the case where the partial aerial region is determined to match the ground-view image.

3. The image matching apparatus according to claim 1, wherein the extraction of the plurality of partial aerial regions includes to divide the aerial-view image into the plurality of partial aerial regions using a plurality of radial lines.

4. The image matching apparatus according to claim 1, wherein the extraction of the plurality of partial aerial regions includes:

cropping a circular region out of the aerial-view image; and dividing the circular region into the plurality of partial aerial regions.

5. The image matching apparatus according to claim 1, wherein the combined aerial feature is a concatenation of the features of the partial aerial region and the features of the aerial-view image, or the combined aerial feature is a weighed sum of the features of the partial aerial region and the features of the aerial-view image.

6. A computer based cross-view matching method performed by a computer, comprising:

acquiring a ground-view image and an aerial-view image;

extracting features from the ground-view image;

extracting features from the aerial-view image;

extracting a plurality of partial aerial regions from the aerial-view image;

extracting features from each of the plurality of partial aerial regions;

for each of the plurality of partial aerial regions, computing a combined aerial feature by combining the features of the partial aerial region and the features of the aerial-view image; and for each of the plurality of partial aerial regions, determining whether the partial aerial region matches the ground-view image by comparing the combined aerial feature of the partial aerial region and the features of the ground-view image, wherein the features from the ground-view image, the features from the aerial-view image and the features from each of the plurality of partial aerial regions are extracted based on one or more models, and wherein the comparing the combined aerial feature of the partial aerial region and the features of the ground-view image comprises:

computing a degree of similarity between the combined aerial feature of the partial aerial region and the features of the ground-view image; and determining that the partial aerial region matches the ground-view image based on a determination that the computed degree of similarity is equal to or larger than a predefined threshold.

7. The control method according to claim 6, further comprising:

determining that the ground-view image matches the aerial-view image in the case where the partial aerial region is determined to match the ground-view image.

8. The control method according to claim 6, wherein the extraction of the plurality of partial aerial regions includes to divide the aerial-view image into the plurality of partial aerial regions using a plurality of radial lines.

9. The control method according to claim 6, wherein the extraction of the plurality of partial aerial regions includes:

cropping a circular region out of the aerial-view image; and dividing the circular region into the plurality of partial aerial regions.

10. The control method according to claim 6, wherein the combined aerial feature is a concatenation of the features of the partial aerial region and the features of the aerial-view image, or the combined aerial feature is a weighed sum of the features of the partial aerial region and the features of the aerial-view image.

11. A non-transitory computer-readable storage medium storing a program that causes a computer to execute computer based cross-view matching operations comprising:

acquiring a ground-view image and an aerial-view image;

extracting features from the ground-view image;

extracting features from the aerial-view image;

extracting a plurality of partial aerial regions from the aerial-view image;

extracting features from each of the plurality of partial aerial regions;

for each of the plurality of partial aerial regions, computing a combined aerial feature by combining the features of the partial aerial region and the features of the aerial-view image; and for each of the plurality of partial aerial regions, determining whether the partial aerial region matches the ground-view image by comparing the combined aerial feature of the partial aerial region and the features of the ground-view image, wherein the features from the ground-view image, the features from the aerial-view image and the features from each of the plurality of partial aerial regions are extracted based on one or more models, and wherein the comparing the combined aerial feature of the partial aerial region and the features of the ground-view image comprises:

computing a degree of similarity between the combined aerial feature of the partial aerial region and the features of the ground-view image; and determining that the partial aerial region matches the ground-view image based on a determination that the computed degree of similarity is equal to or larger than a predefined threshold.

12. The storage medium according to claim 11, wherein the program causes the computer to further execute:

determining that the ground-view image matches the aerial-view image in the case where the partial aerial region is determined to match the ground-view image.

13. The storage medium according to claim 11, wherein the extraction of the plurality of partial aerial regions includes to divide the aerial-view image into the plurality of partial aerial regions using a plurality of radial lines.

14. The storage medium according to claim 11, wherein the extraction of the plurality of partial aerial regions includes:

cropping a circular region out of the aerial-view image; and dividing the circular region into the plurality of partial aerial regions.

15. The storage medium according to claim 11, wherein the combined aerial feature is a concatenation of the features of the partial aerial region and the features of the aerial-view image, or the combined aerial feature is a weighed sum of the features of the partial aerial region and the features of the aerial-view image.

* * * * *